United States Patent
Chen et al.

(10) Patent No.: US 10,450,514 B2
(45) Date of Patent: Oct. 22, 2019

(54) PROCESS AND APPARATUS FOR ENHANCED REMOVAL OF CONTAMINANTS IN FLUID CATALYTIC CRACKING PROCESSES

(71) Applicant: Lummus Technology Inc., Bloomfield, NJ (US)

(72) Inventors: Liang Chen, Houston, TX (US); Peter Loezos, The Woodlands, TX (US); Rama Rao Marri, Katy, TX (US); Bryan Tomsula, Seabrook, TX (US); Jon A. Hood, The Woodlands, TX (US); Hardik Singh, The Woodlands, TX (US); Michael Dorsey, The Woodlands, TX (US); Justin Breckenridge, The Woodlands, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 124 days.

(21) Appl. No.: 15/705,769

(22) Filed: Sep. 15, 2017

(65) Prior Publication Data
US 2018/0079968 A1    Mar. 22, 2018

Related U.S. Application Data

(60) Provisional application No. 62/395,724, filed on Sep. 16, 2016.

(51) Int. Cl.
*C10G 11/18*      (2006.01)
*B01J 8/32*       (2006.01)
(Continued)

(52) U.S. Cl.
CPC .......... *C10G 11/182* (2013.01); *B01J 8/0055* (2013.01); *B01J 8/0065* (2013.01); *B01J 8/1845* (2013.01);
(Continued)

(58) Field of Classification Search
CPC ..... C10G 11/18; C10G 11/182; C10G 11/187; B01J 8/0055; B01J 8/1854; B01J 8/1863;
(Continued)

(56) References Cited

U.S. PATENT DOCUMENTS 4,465,588 A    8/1984 Occelli et al.
4,485,184 A   11/1984 Hettinger, Jr. et al.
(Continued)

FOREIGN PATENT DOCUMENTS

CN    103874747 A    6/2014

OTHER PUBLICATIONS

International Search Report and Written Opinon issued in corresponding International Application No. PCT/US2017/051736 dated Jan. 29, 2018, (12 pages).

*Primary Examiner* — Renee Robinson
(74) *Attorney, Agent, or Firm* — Osha Liang LLP

(57) ABSTRACT

Systems for separating a contaminant trapping additive from a cracking catalyst may include a contaminant removal vessel having one or more fluid connections for receiving contaminated cracking catalyst, contaminated contaminant trapping additive, fresh contaminant trapping additive, and a fluidizing gas. In the contaminant removal vessel, the spent catalyst may be contacted with contaminant trapping additive, which may have an average particle size and/or density greater than the cracking catalyst. A separator may be provided for separating an overhead stream from the contaminant removal vessel into a first stream comprising cracking catalyst and lifting gas and a second stream com-
(Continued)

prising contaminant trapping additive. A recycle line may be used for transferring contaminant trapping additive recovered in the second separator to the contaminant removal vessel, allowing contaminant trapping additive to accumulate in the contaminant removal vessel. A bottoms product line may provide for recovering contaminant trapping additive from the contaminant removal vessel.

5 Claims, 6 Drawing Sheets

(51) Int. Cl.
| | | |
|---|---|---|
| | *B01J 38/72* | (2006.01) |
| | *B01J 38/00* | (2006.01) |
| | *B01J 8/26* | (2006.01) |
| | *B01J 8/18* | (2006.01) |
| | *B01J 8/00* | (2006.01) |

(52) U.S. Cl.
CPC ........... *B01J 8/1854* (2013.01); *B01J 8/1863* (2013.01); *B01J 8/26* (2013.01); *B01J 8/32* (2013.01); *B01J 38/00* (2013.01); *B01J 38/72* (2013.01); *C10G 11/187* (2013.01); *B01J 2208/0038* (2013.01); *B01J 2208/00752* (2013.01); *B01J 2208/00761* (2013.01); *B01J 2208/00991* (2013.01); *C10G 2300/70* (2013.01)

(58) Field of Classification Search
CPC ......... B01J 8/24; B01J 8/26; B01J 8/32; B01J 38/00; B01J 38/72
See application file for complete search history.

(56) References Cited

U.S. PATENT DOCUMENTS

| | | | | |
|---|---|---|---|---|
| 4,895,636 | A | * | 1/1990 | Chen ...................... C10G 11/18 208/113 |
| 4,971,766 | A | * | 11/1990 | Chen ...................... C10G 11/18 422/144 |
| 5,057,205 | A | * | 10/1991 | Chin ...................... C10G 11/18 208/113 |
| 5,110,775 | A | * | 5/1992 | Owen .................. C10G 11/182 208/113 |
| 5,174,890 | A | | 12/1992 | Occelli |
| 5,260,240 | A | | 11/1993 | Guthrie et al. |
| 5,286,691 | A | | 2/1994 | Harandi et al. |
| 5,965,012 | A | | 10/1999 | Lomas |
| 6,010,618 | A | | 1/2000 | Lomas |
| 6,538,169 | B1 | | 3/2003 | Pittman et al. |
| 6,610,255 | B1 | | 8/2003 | Cao et al. |
| 8,197,669 | B2 | | 6/2012 | Vierheilig |
| 2010/0025297 | A1 | | 2/2010 | Vierheilig |
| 2010/0152020 | A1 | | 6/2010 | Palmas et al. |
| 2014/0001092 | A1 | | 1/2014 | Mezza et al. |
| 2014/0014555 | A1 | | 1/2014 | Marri et al. |

* cited by examiner

PROCESS AND APPARATUS FOR ENHANCED REMOVAL OF CONTAMINANTS IN FLUID CATALYTIC CRACKING PROCESSES

FIELD OF THE DISCLOSURE

Embodiments disclosed herein relate generally to processes and apparatus for removal of contaminants from catalysts. More specifically, embodiments disclosed herein relate to enhanced removal of contaminants, such as iron, calcium, and phosphorus, from fluid catalytic cracking (FCC) catalysts.

BACKGROUND

Emergence of tight oil and shale oil offer abundant oil resources. However, it poses significant processing challenges due to the difference in oil properties and chemical compositions. Specifically, in order to process tight/shale oil using FCC technology in a refinery, one big challenge is the high levels of unconventional metals, such as iron and calcium, as compared to processing conventional crude oil.

High levels of iron, calcium and other metals, for example, may result in deposition of iron and calcium on the catalyst surface. The deposited iron and calcium may form a thick layer of metal shell on the catalyst, causing a loss of diffusivity of oil vapor. This results in a loss of conversion and an increase in coke and heavy oil products. A high level of iron and calcium deposition on catalysts may change the catalyst properties, affecting catalyst circulation and leading to processing and performance issues.

In order to minimize the effect of these unconventional metals, especially at higher contaminant levels found in tight/shale oil, refiners usually must significantly increase their daily catalyst addition to mitigate metal deposition on catalyst and facilitate catalyst circulation. This, however, leads to a dramatic increase in operation cost.

Various methods and additives have been proposed to remove metals from catalysts. The additives have been proposed for use as a diluent in a riser reactor, for example, or contacted with a catalyst in a catalyst cooler, as another example. Patents related to such processes and additives include U.S. Pat. Nos. 8,197,669, 6,610,255, 5,286,691, 5,260,240, 5,174,890, and 4,465,588, among others.

SUMMARY OF THE DISCLOSED EMBODIMENTS

Embodiments disclosed herein provide for effective removal of contaminants, such as iron, vanadium, calcium, phosphorous, and others, from catalysts. Due to the high mobility of metal contaminants, such as iron, embodiments herein use a contaminant trapping additive, also referred to herein as a metal trapping additive, to preferentially absorb the contaminants, reducing the level of contaminant deposition on the catalyst surface and maintaining catalyst activity.

In one aspect, embodiments disclosed herein relate to a system for cracking of hydrocarbons. The system may include a first reactor for contacting a cracking catalyst with a hydrocarbon feedstock to convert at least a portion of the hydrocarbon feedstock to lighter hydrocarbons. A separator may be provided for separating the lighter hydrocarbons from spent cracking catalyst, and a feed line may be used for feeding separated spent cracking catalyst from the separator to a catalyst regenerator. A catalyst transfer line may transfer a portion of the spent cracking catalyst from the catalyst regenerator to a contaminant removal vessel. The contaminant removal vessel may be used for contacting the spent catalyst with a contaminant trapping additive having an average particle size and/or density greater than those of the cracking catalyst. A second separator separates an overhead stream from the contaminant removal vessel into a first stream comprising cracking catalyst and lifting gas and a second stream comprising contaminant trapping additive. A recycle line is provided for transferring contaminant trapping additive recovered in the second separator to the contaminant removal vessel, and a bottoms product line is provided for recovering contaminant trapping additive from the contaminant removal vessel. A flow conduit may also be provided for transferring the first stream to the catalyst regenerator.

In another aspect, embodiments disclosed herein relate to a process for removing contaminants from a catalyst. The process may include feeding a catalyst comprising contaminants to a contaminant removal vessel, and feeding a contaminant trapping additive to the contaminant removal vessel, wherein the contaminant trapping additive has an average particle size greater than an average particle size of the catalyst and/or a density greater than the catalyst. The catalyst and the contaminant trapping additive may be fluidized with a lifting gas, contacting the catalyst with the contaminant trapping additive, and transferring contaminants from the catalyst to the contaminant trapping additive. The process also includes withdrawing from the contaminant removal vessel a first stream comprising lifting gas, contaminant trapping additive, and catalyst having a reduced amount of contaminants. The contaminant trapping additive may be separated from the first stream, producing a recycle stream comprising contaminant trapping additive and a catalyst product stream comprising the lifting gas and the catalyst having a reduced amount of contaminants. The contaminant trapping additive in the recycle stream may be returned to the contaminant removal vessel.

In another aspect, embodiments disclosed herein relate to a method of regenerating and removing contaminants from a catalyst. The method may include feeding a catalyst comprising contaminants to a contaminant removal vessel, and feeding a contaminant trapping additive to the contaminant removal vessel, wherein the contaminant trapping additive has an average particle size greater than the catalyst and/or a density greater than the catalyst. Fluidizing the catalyst and the contaminant trapping additive with a lifting gas may provide for contacting the catalyst with the contaminant trapping additive, and transferring contaminants from the catalyst to the contaminant trapping additive, as well as withdrawing from the contaminant removal vessel a first stream comprising lifting gas, contaminant trapping additive, and catalyst having a reduced amount of contaminants. The contaminant trapping additive may be separated from the first stream, producing a recycle stream comprising contaminant trapping additive and a catalyst product stream comprising the lifting gas and the catalyst having a reduced amount of contaminants. The contaminant trapping additive in the recycle stream may be returned to the contaminant removal vessel. The method may also include withdrawing from the contaminant removal vessel a second stream comprising contaminant trapping additive, feeding the catalyst product stream to a catalyst regenerator, and separating the catalyst from the lifting gas and regenerating the catalyst in the catalyst regenerator.

In another aspect, embodiments disclosed herein relate to a process for the cracking of hydrocarbons. The process may include contacting a cracking catalyst with a hydrocarbon feedstock in a riser reactor to convert hydrocarbons in the hydrocarbon feedstock to lighter hydrocarbons, wherein the hydrocarbon feedstock further comprises one or more contaminants selected from the group consisting of iron, calcium, and phosphorous. An effluent may be recovered from the riser reactor comprising hydrocarbons and contaminated cracking catalyst. The process also includes separating the hydrocarbons from the contaminated cracking catalyst in the effluent to recover a hydrocarbon product stream and a solids stream comprising contaminated cracking catalyst, transferring the contaminated cracking catalyst in the solids stream to a catalyst regeneration vessel, and withdrawing a portion of the contaminated cracking catalyst from the catalyst regeneration vessel and feeding the withdrawn portion to a contaminant removal vessel. A contaminant trapping additive may also be fed to the contaminant removal vessel, wherein the contaminant trapping additive has an average particle size greater than the cracking catalyst and/or a density greater than the cracking catalyst. The cracking catalyst and the contaminant trapping additive may be fluidized with a lifting gas, thereby contacting the catalyst with the contaminant trapping additive and transferring contaminants from the catalyst to the contaminant trapping additive, and facilitating withdrawing from the contaminant removal vessel an overhead stream comprising lifting gas, contaminant trapping additive, and cracking catalyst having a reduced amount of contaminants. The contaminant trapping additive may be separated from the overhead stream, producing a recycle stream comprising contaminant trapping additive and a catalyst product stream comprising the lifting gas and the cracking catalyst having a reduced amount of contaminants. The process may also include returning the contaminant trapping additive in the recycle stream to the contaminant removal vessel, withdrawing from the contaminant removal vessel a bottoms stream comprising contaminant trapping additive, feeding the catalyst product stream to a catalyst regenerator, and separating the catalyst from the lifting gas and regenerating the catalyst in the catalyst regenerator.

Other embodiments disclosed herein may be directed toward systems for separating a contaminant trapping additive from a cracking catalyst may include a contaminant removal vessel having one or more fluid connections for receiving contaminated cracking catalyst, contaminated contaminant trapping additive, fresh contaminant trapping additive, and a fluidizing gas. In the contaminant removal vessel, the spent catalyst may be contacted with a contaminant trapping additive, where the contaminant trapping additive may have an average particle size and/or density greater than those of the cracking catalyst. A separator may be provided for separating an overhead stream from the contaminant removal vessel into a first stream comprising cracking catalyst and lifting gas and a second stream comprising contaminant trapping additive. A recycle line may be used for transferring contaminant trapping additive recovered in the second separator to the contaminant removal vessel, thus allowing contaminant trapping additive to accumulate in the contaminant removal vessel. A bottoms product line may be provided for recovering contaminant trapping additive from the contaminant removal vessel.

Other aspects and advantages will be apparent from the following description and the appended claims.

DETAILED DESCRIPTION

Figure 1:
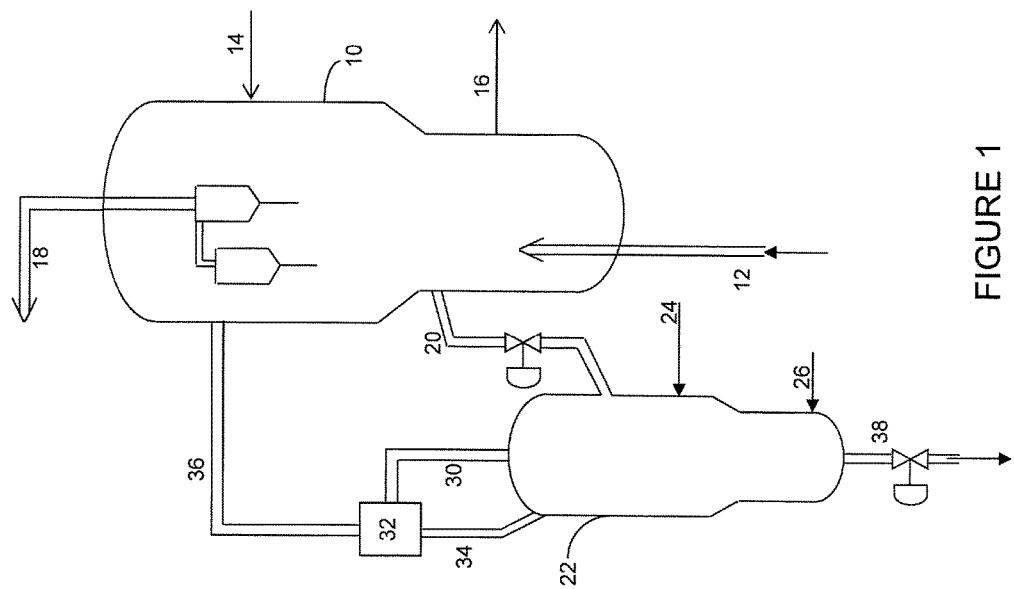
FIG. 1 is a simplified process flow diagram of a process for separating used contaminant trapping additive from FCC catalyst and removing it from the system inventory catalyst according to one or more embodiments disclosed herein.

Embodiments disclosed herein relate generally to processes and apparatus for removal of contaminants from catalysts. More specifically, embodiments disclosed herein relate to enhanced removal of contaminants, such as iron, calcium, and phosphorus, from fluid catalytic cracking (FCC) catalysts. In another aspect, embodiments disclosed herein relate to the continuous separation, removal from unit inventory and addition of fresh contaminants trapping additive.

Embodiments herein may use a classifier/separator for separating contaminant trapping additive from cracking catalyst. This device can be attached to either the existing FCC stripper or regenerator vessels. As briefly described above, in some embodiments, systems for separating a contaminant trapping additive from a cracking catalyst may include a contaminant removal vessel having one or more fluid connections for receiving contaminated cracking catalyst, contaminated contaminant trapping additive, fresh contaminant trapping additive, and a fluidizing gas. In the contaminant removal vessel, the spent catalyst may be contacted with a contaminant trapping additive, where the contaminant trapping additive may have an average particle size and/or density greater than those of the cracking catalyst. A separator may be provided for separating an overhead stream from the contaminant removal vessel into a first stream comprising cracking catalyst and lifting gas and a second stream comprising contaminant trapping additive. A recycle line may be used for transferring contaminant trapping additive recovered in the second separator to the contaminant removal vessel, thus allowing contaminant trapping additive to accumulate in the contaminant removal vessel. A bottoms product line may be provided for recovering contaminant trapping additive from the contaminant removal vessel.

The continuous separation, removal from unit inventory, and addition of fresh contaminant trapping additive provided by systems according to embodiments herein may be used to substantially minimize the deactivation of FCC catalyst or improve the catalyst dynamic activity, and improve desired product yields and selectivity. Such a contaminant removal system may benefit cracking processes, as will be described further below.

Processes for removing contaminants from a catalyst according to embodiments herein may include feeding a catalyst including contaminants to a contaminant removal vessel. The catalyst may be contaminated with compounds or metals that result in a decrease in the catalyst activity or performance for converting a compound to a desired end product.

The process may also include feeding a contaminant trapping additive to the contaminant removal vessel. Useful contaminant trapping additives are compounds and structures that have a higher affinity for the contaminants than the catalyst at conditions in the contaminant removal vessel. The contaminant may thus be preferentially absorbed or retained on the contaminant trapping additive. To facilitate separation of the contaminant trapping additive from the catalyst, the contaminant trapping additive may have an average particle size greater than the catalyst and/or a density greater than the catalyst.

The mixture of contaminant trapping additive and contaminated catalyst resulting in the contaminant removal vessel may be fluidized with a lifting gas. Fluidizing the mixture results in intimate contact of the catalyst with the contaminant trapping additive, transferring contaminants from the catalyst to the contaminant trapping additive. The lifting gas may be supplied to the contaminant removal vessel at a rate sufficient to fluidize both the catalyst particles and a portion of the contaminant trapping additive particles.

The lifting gas may include steam, air or oxygen, nitrogen, or other fluidization gases. Conditions in the contaminant removal vessel may be maintained at a temperature sufficient to promote the mobility of the contaminants between particles. As the contaminant trapping additive has a higher affinity for the contaminants, the net effect of the interaction between the catalyst and the contaminant trapping additive is the removal of the contaminants from the catalyst particles.

The fluidized particle mixture may be withdrawn from the contaminant removal vessel as an overheads stream, and may include the lifting gas, contaminant trapping additive, and the catalyst, now having a reduced amount of contaminants. The overhead mixture may then be separated based on particle size and/or density. The solids separator may be a cyclone or other vessel or device where solids and gases are introduced at a common inlet, and through a combination of inertial, gravitational and centrifugal forces, the particles are separated based on size and/or density with preference to the smaller and/or less dense catalyst particles entraining to the vapor outlet of the solids separator, while the larger and/or more dense contaminant trapping additives return to the contaminant removal vessel via a dense phase standpipe or dipleg.

Fluidization conditions are maintained, as noted above, to carry over both catalyst and contaminant trapping additives to the solids separator. The separated contaminant trapping additives may be returned to the contaminant removal vessel for continued contact with contaminated catalyst particles. In the contaminant removal vessel, a level of contaminant trapping additive may accumulate at a bottom of the vessel, and may be withdrawn, continuously or intermittently, and sent for regeneration or proper disposal.

Contaminants that may be encountered with various hydrocarbon feedstocks may include one or more of iron, copper, calcium, phosphorous, vanadium, nickel, and sodium, among others. Such contaminants can have a detrimental effect on catalysts, such as cracking catalysts, including FCC catalysts, used for converting heavier hydrocarbons to lighter hydrocarbons. Various contaminants may poison the cracking catalyst and reduce its activity. The contaminants may also plug pores or reduce diffusivity through the catalyst pores, inhibiting the effectiveness of the catalyst.

The contaminant trapping additive, as noted above, should have a higher affinity for the contaminant than the catalyst. The particular type of contaminant trapping additive used may thus depend on the particular contaminant(s) to be targeted. Contaminant trapping additives useful in some embodiments disclosed herein may include commercially available vanadium/nickel/iron traps (additives) manufactured by FCC catalyst vendors. In some embodiments, the metals trapping additive may include a magnesium oxide and/or alumina based support having calcium, tin, cesium, or other metals promotion for effectively trapping the iron, copper, phosphorous, vanadium, nickel, sodium, calcium, or other contaminant metals that may be contained within the hydrocarbon feedstocks. The present focus is to remove these contaminants efficiently from the FCC catalyst (mainly responsible for catalytic cracking) to minimize the detrimental effect in the riser-reactor.

In order to improve the solid separation efficiency, the contaminant trapping additive may have a larger particle size and/or a higher density than the cracking catalysts. For example, cracking catalysts, such as Y-type zeolite based FCC cracking catalysts conventionally used in commercial FCC units, may have typical particle sizes in the range from about 20 microns to about 200 microns, and may have apparent bulk density in the range from about 0.60 g/cc to about 1.1 g/cc. These catalysts/additives used in FCC and its family cracking processes according to embodiments herein may include a single type of catalyst or a mixture of catalysts.

Contaminant trapping additives useful in embodiments herein may have a particle size larger than the cracking catalysts/additives used, such as a particle size in the range from about 20 microns to about 350 microns. Additionally, or alternatively, the contaminant trapping additives may have a bulk density greater than that of the catalysts, such as a density in the range from about 0.7 g/cc to about 1.2 g/cc.

The differences in size and/or density between the contaminant trapping additive and the catalyst may facilitate separation in the solids separator. Embodiments herein may use a classifier/separator for separating contaminant trapping additive from catalyst. This device can be attached to either the existing FCC stripper or regenerator vessels.

Operating conditions in the contaminant removal vessel may include feeding the lifting gas to the contaminant removal vessel at a flow rate to operate in the bubbling bed, turbulent bed, fast fluidization, or pneumatic transport flow regimes. For example, the bed may operate in a bubbling/turbulent regime (e.g., at a gas superficial velocity in the range from about 0.01 to about 1.0 m/s), in the conventional turbulent flow regime at a superficial gas velocity in the range of 0.5 to 1.2 m/s, and in the fast fluidization or pneumatic transport regimes at higher superficial gas velocities, depending upon the actual particle densities.

Embodiments disclosed herein may provide numerous benefits, including: improved contaminant trapping additive separation from FCC catalyst, capability for continuous removal of spent/used contaminant trapping additive and addition of fresh additive; flexibility for de-coupling of the riser reactor and regenerator from the contaminant transfer additive when metal effects are insignificant; and the ability to increase concentration of the contaminant transfer additive relative to catalyst in the contaminant removal vessel which is especially helpful when the additive concentration is too low in the system inventory. The separation device employed in embodiments herein may provide wider operational flexibility compared other solid separation concepts such as "difference in particle settling velocities and minimum fluidization/bubbling velocity."

The above-described system and method for transferring contaminants from a catalyst to a contaminant trapping additive may be used according to some embodiments herein in conjunction with a catalyst regenerator for regenerating a catalyst. A catalyst, such as an FCC catalyst, following use, may have accumulated various contaminants. The contaminated cracking catalyst and contaminant trapping additive may be fed to a contaminant removal vessel.

The contaminant trapping additive may have an average particle size greater than the catalyst and/or a density greater than the catalyst.

The catalyst and the contaminant trapping additive may then be fluidized with a lifting gas, contacting the catalyst with the contaminant trapping additive and transferring contaminants from the catalyst to the contaminant trapping additive. The contaminant removal vessel may be fluidized with the lifting gas to withdraw from the contaminant removal vessel a first stream including the lifting gas, the contaminant trapping additive, and catalyst having a reduced amount of contaminants.

The contaminant trapping additive, based on size and/or density, may be separated from the first stream, producing a recycle stream comprising contaminant trapping additive and a catalyst product stream comprising the lifting gas and the catalyst having a reduced amount of contaminants. The contaminant trapping additive in the recycle stream may be returned to the contaminant removal vessel for continued contact with additional contaminated catalyst. A second stream comprising contaminant trapping additive may also be withdrawn from the contaminant removal vessel.

The catalyst product stream, including lifting gas and catalyst, having a reduced amount of contaminants, may be fed to a catalyst regenerator. In the catalyst regenerator, the catalyst may be separated from the lifting gas and may also undergo regeneration.

The above-described system and method for transferring contaminants from a catalyst to a contaminant trapping additive may be used according to some embodiments herein in conjunction with a system for cracking a hydrocarbon, which may include a catalyst regenerator for regenerating a catalyst and a riser reactor, for example. A process for the cracking of hydrocarbons may include, for example, contacting a cracking catalyst with a hydrocarbon feedstock in a riser reactor to convert hydrocarbons in the hydrocarbon feedstock to lighter hydrocarbons, where the hydrocarbon feedstock may include one or more contaminants selected from the group consisting of iron, calcium, and phosphorous. An effluent may be recovered from the riser reactor, the effluent including hydrocarbons and contaminated cracking catalyst.

The hydrocarbons may be separated from the contaminated cracking catalyst in the effluent to recover a hydrocarbon product stream and a solids stream including contaminated cracking catalyst. The effluent may be separated via gas/solid separations, and the catalyst may be further contacted with a stripping agent to remove additional hydrocarbons. Following hydrocarbon separations/removal, the contaminated cracking catalyst may then be transferred to a catalyst regeneration vessel to undergo regeneration.

During regeneration, a portion of the contaminated cracking catalyst may be withdrawn from the catalyst regeneration vessel and fed to a contaminant removal vessel. A contaminant trapping additive may also be fed to the contaminant removal vessel. The contaminant trapping additive may have an average particle size greater than the catalyst and/or a density greater than the catalyst.

The catalyst and the contaminant trapping additive may then be fluidized with a lifting gas, contacting the catalyst with the contaminant trapping additive and transferring contaminants from the catalyst to the contaminant trapping additive. The contaminant removal vessel may be fluidized with the lifting gas to withdraw from the contaminant removal vessel a first stream including the lifting gas, the contaminant trapping additive, and catalyst having a reduced amount of contaminants.

The contaminant trapping additive, based on size and/or density, may be separated from the first stream, producing a recycle stream comprising contaminant trapping additive and a catalyst product stream comprising the lifting gas and the catalyst having a reduced amount of contaminants. The contaminant trapping additive in the recycle stream may be returned to the contaminant removal vessel for continued contact with additional contaminated catalyst. A second stream comprising contaminant trapping additive may also be withdrawn from the contaminant removal vessel.

The catalyst product stream, including lifting gas and catalyst, having a reduced amount of contaminants, may be fed back to the catalyst regenerator for continued regeneration.

Systems for cracking hydrocarbons according to embodiments herein may thus include a first reactor, such as a riser reactor, for contacting a cracking catalyst with a hydrocarbon feedstock to convert at least a portion of the hydrocarbon feedstock to lighter hydrocarbons. The system may also include a first separator for separating the lighter hydrocarbons from spent cracking catalyst.

A feed line may be provided for returning separated spent cracking catalyst from the separator to a catalyst regenerator. Likewise, a catalyst transfer line may be provided for transferring a portion of the spent cracking catalyst from the catalyst regenerator to a contaminant removal vessel.

The contaminant removal vessel may be used for contacting the spent catalyst with a contaminant trapping additive having an average particle size and/or density greater than that of the cracking catalyst. A second separator may be used for separating an overhead stream from the contaminant removal vessel. The second separator may be fluidly attached to (i) a recycle line for transferring contaminant trapping additive recovered in the second separator to the contaminant removal vessel, or (ii) an overheads product line for forwarding the catalyst, having a reduced contaminant level, to the catalyst regenerator, for continued regeneration.

The second separator may be used for separating catalysts or other particles based on size and/or density difference. The separator, in some embodiments herein, may have a minimum of one inlet and may also have a minimum of two outlets for separating particles from carrier gases, and may be disposed internal or external to the contaminant removal vessel. The carrier gas enters the separator with the particles whereupon inertial, centrifugal and/or gravitational forces may be exerted on the particles such that a portion of the particles and carrier gas are collected in the first outlet and a portion of the particles along with the carrier gas are collected in the second outlet. The combination of forces in the separator may have the effect of enriching an outlet stream in particle size and/or density versus the inlet concentration. The separator may have additional carrier gas distribution or fluidization inside of the vessel/chamber to exert additional forces on the particles which may facilitate enhanced classification.

Referring now to FIG. 1, a simplified flow diagram of a system for removing contaminants from a catalyst is illustrated. A catalyst regenerator 10 may receive spent catalyst, which may include a single type of catalyst or a mixture of catalysts, from a stripper (not shown) via flow line 12. Fresh catalyst may be added to regenerator 10 through catalyst addition line 14, and old catalyst may be removed from regenerator 10 through catalyst withdrawal line 16. Regeneration of the spent catalyst and activation of the fresh catalyst may be conducted via heating and/or oxidation, as known in the art, resulting in a flue gas recovered via flow line 18.

Catalyst is continuously or intermittently removed from the regeneration vessel 10 via flow line 20 and transported to contaminant removal vessel 22. A contaminant trapping additive is added via flow line 24 to contaminant removal vessel 22. The contaminant trapping additive added may include fresh and/or regenerated contaminant trapping additive. The contaminant trapping additive will preferentially absorb the metal contaminants as compared to the catalyst, due to the high mobility of these metal contaminants under contaminant removal vessel 22 operating conditions.

A lifting gas is introduced to a lower portion of the contaminant removal vessel 22 via flow line 26. The lifting gas may be steam, air or oxygen, nitrogen, or other fluidization gases or mixtures thereof, for example. The flow of lifting gas may be sufficient to operate the bed of particles in the contaminant removal vessel in the turbulent bed, bubbling bed, or fast fluidization regimes.

The lifting gas flow rate should be sufficient to lift the solids, including the catalyst and at least a portion of the contaminant trapping additives, through flow line 30 to a solids separator 32. In solids separator 32, the catalyst particles, having a reduced amount of contaminants as compared to the catalyst as fed to the contaminant removal vessel, may be separated from the contaminant trapping additive particles. The contaminant trapping additive may be returned to the contaminant removal vessel via a dipleg or standpipe 34, and the catalyst may be carried over via flow line 36, returning the catalyst to the regenerator 10.

Spent contaminant trapping additives, having accumulated an amount of metals or other contaminants, may be withdrawn from the bottom of the contaminant removal vessel 22 via flow line 38. The withdrawn contaminant trapping additive may then be regenerated or otherwise properly disposed.

Introduction of metal trapping additives directly to contaminant removal vessel 22 rather than the regenerator 10 may be used to create a relatively high concentration of metal trapping additives environment locally as compared to the catalyst.

The properties of metal trapping additives can also be tailored to possess larger particle size and/or higher particle density as compared to the FCC catalyst undergoing regeneration. When the carried solid mixture of catalyst and metal trapping additives go through the solids separator 32, the separator is designed to separate heavier and/or larger metal trapping additives from the lighter and/or smaller FCC catalyst. The FCC catalyst preferentially returns to the regenerator 10, while the majority of metal trapping additives will fall through a dipleg or standpipe and return to contaminant removal vessel 22, resulting in a higher concentration of metal trapping additives in the vessel 22.

The solids separator 32 may be a cyclone or other device or vessel where solids and gases are introduced at a common inlet and through a combination of inertial, gravitational and centrifugal forces, the particles are separated based on size and/or density with preference to the smaller and/or less dense FCC catalyst particles entraining to the vapor outlet to the regenerator 10, while the majority of the larger and/or more dense contaminant trapping additives return to contaminant removal vessel 22 via a dense phase standpipe or dipleg. Solid separators 32 useful in various embodiments herein are described below with respect to FIGS. 3-6.

Figure 2:
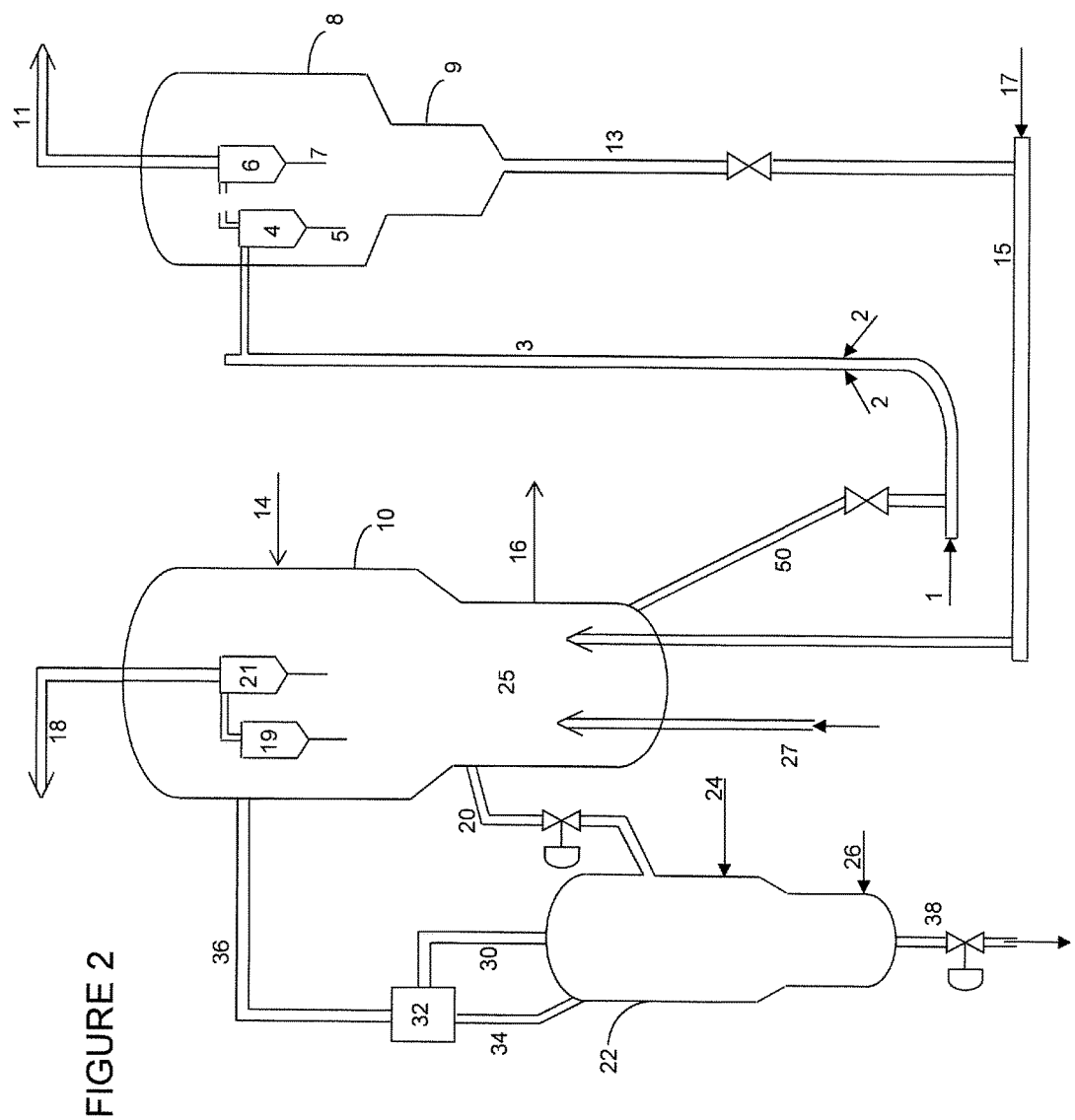
FIG. 2 is a simplified process flow diagram of improved processes for cracking hydrocarbons and producing light olefins according to one or more embodiments disclosed herein.

Referring now to FIG. 2, a simplified flow diagram of a system for cracking of a hydrocarbon feedstock to produce lighter hydrocarbons is illustrated, where like numerals represent like parts. Embodiments herein may be used catalytically crack a hydrocarbon feed, such as a light, medium, or heavy hydrocarbon feed, such as vacuum gas oil and/or heavy oil residues, to provide a high yield of light olefins, such as propylene and ethylene, aromatics and gasoline with high octane number or middle distillates, for example. To accomplish this goal, a contaminant removal vessel is integrated with a fluid catalytic cracking reactor, such as a riser reactor.

The operation of the catalyst regeneration vessel 10 and contaminant removal vessel 22 are as described above. In the catalyst regeneration vessel 10, spent catalyst recovered from both the riser reactor and the contaminant removal vessel is regenerated. Following regeneration, the catalyst may be fed via flow line 50 from the regeneration vessel to a riser reactor 3 (co-current flow reactor).

In the riser reactor 3, a lifting gas 1, such as steam, and one or more hydrocarbon feeds 2 are contacted with the catalyst to crack at least a portion of the hydrocarbons to form lighter hydrocarbons. In addition to lift steam, a provision may also be made to inject feed streams such as $C_4$ olefins and naphtha separately from the hydrocarbon feeds 2, and may be injected upstream of inlets 2, such as proximate the Y-section of the riser of the J-bend, or downstream of inlets 2 as illustrated. As an example of riser operations, a heavy petroleum residue feed is injected through one or more feed injectors 2 located near the bottom of first riser reactor 3. The heavy petroleum feed contacts hot regenerated catalyst introduced through the 3-bend. The catalyst, for example, can be a Y-type zeolite based catalyst, which may be used alone or in combination with other catalysts, such as ZSM-5 or ZSM-11. An effluent may then be recovered from the riser reactor 3, the effluent including a cracked hydrocarbon product and a spent catalyst fraction.

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 10. The pressure in riser reactor 3 is typically in the range from about 1 barg to about 5 barg.

The effluent (cracked hydrocarbons and spent catalyst) from the riser reactor is fed to a disengagement vessel 8 to separate the spent catalyst fraction from the cracked hydrocarbon products. The cracked hydrocarbon products, including light olefins, $C_4$ hydrocarbons, naphtha range hydrocarbons, and heavier hydrocarbons may then be separated to recover the desired products or product fractions. For example, after the major part of the cracking reaction is completed, the mixture of products, unconverted feed vapors, and spent catalyst flow into a two stage cyclone system housed in cyclone containment vessel 8. The two-stage cyclone system includes a primary cyclone 4, for separating spent catalyst from vapors. The spent catalyst is discharged into stripper 9 through primary cyclone dip leg 5. Fine catalyst particles entrained with the separated vapors from primary cyclone 4 are separated in second stage cyclone 6. The catalyst collected is discharged into stripper 9 via dip leg 7. The vapors from second stage cyclone 6 are vented through a secondary cyclone outlet, and are then routed to a main fractionator/gas plant (not shown) through reactor vapor line 11 for recovery of products, including the desired olefins.

The spent catalyst recovered via dip legs 5, 7 undergoes stripping in stripper bed 9 to remove interstitial vapors (the hydrocarbon vapors trapped between catalyst particles) by countercurrent contacting of steam, introduced to the bottom of stripper 9 through a steam distributor (not shown). The spent catalyst is then transferred to regenerator 10 via the spent catalyst standpipe 13 and lift line 15. A small portion of combustion air may be introduced through a distributor 17 to help smooth transfer of spent catalyst.

Coked or spent catalyst is discharged through a spent catalyst distributor in the center of the dense regenerator bed 25. Combustion air is introduced by an air distributor 27 located at the bottom of regenerator bed 25. Coke deposited on the catalyst is then burned off in regenerator 10 via reaction with the combustion air. Regenerator 10, for example, may operate at a temperature in the range from about 640° C. to about 750° C. and a pressure in the range from about 1 barg to about 5 barg. The catalyst fines entrained along with flue gas and lifting gas from the contaminant removal vessel may be collected in first stage cyclone 19 and second stage cyclone 21 and are discharged into the regenerator catalyst bed through respective dip legs. The flue gas recovered from the outlet of second stage cyclone 21 is directed to flue gas line 18 via a regenerator plenum for downstream waste heat recovery and/or power recovery.

Figure 3:
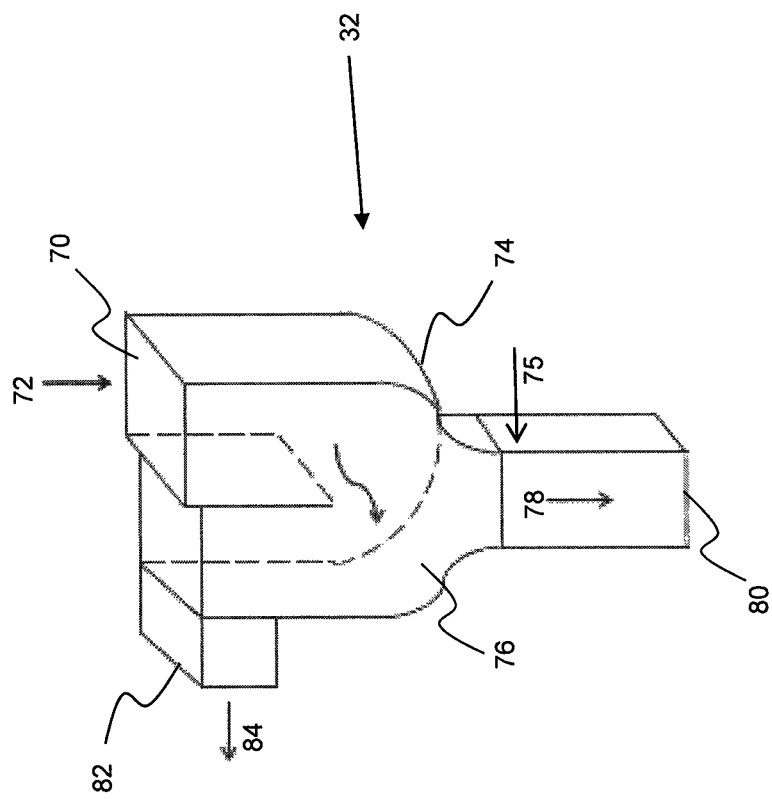
FIGS. 3-6 are simplified process flow diagrams of separators useful in systems and processes according to one or more embodiments disclosed herein.

In some embodiments, separator 32 may be a U-shaped inertial separator, as illustrated in FIG. 3, to separate the particles. The separator may be built in the form of U-shape, having an inlet 70 at the top, a gas outlet 84 at the other end of the U, and a main solid outlet 80 at the base of U-shaped separator.

A mixture 72 of solid particles with different sizes is introduced along with a carrier gas stream through inlet 70 and inertial separation forces are applied on the solids by making no more than one turn to separate the different sizes of solid particles. Larger or heavier solid particles 78 preferentially go downward in sections 74/76 to a standpipe or dipleg 80 connected to the base of U-shape while lighter or smaller solid particles are preferentially carried along with the gas stream to outlet 82, where the mixture 84 of small particles and gases may be recovered. The solid outlet 80 at the base of U-shaped separator (the inlet of the standpipe or dipleg used to flow the larger particles back to the vessel 22) should be large enough to accommodate the desired particle flow rates.

By controlling the gas flow rates entering the downward standpipe and exiting the main gas stream outlet, the overall separation efficiency of the U-shape inertial separator and the selectivity to separate heavier or larger particles from lighter or smaller particles can be manipulated. This extends to a fully sealed dipleg where the only gas stream exiting the dipleg are those entrained by the exiting particle flow.

In some embodiments, a gas sparger 75 or extra steam/inert gas may be provided proximate a top of outlet section 80, such as near a top of the standpipe inlet. The additional lift gas provided within the separator may further facilitate the separation of heavier or larger solid particles from lighter or smaller solid particles, as the extra gas may preferentially lift lighter solid particles to gas outlet 84, resulting in better solid classification.

The cross sectional area of the U-shaped separator at the inlet 70, outlet 82 and throughout the U-shaped separator (including areas 74, 76) may be adjusted to manipulate the superficial gas velocity within the apparatus to control the separation efficiency and the selectivity. In some embodiments, a position of one or more of the separator walls may be adjustable, or a movable baffle may be disposed within one or more sections of the separator, which may be used to control the separation efficiency and selectivity. In some embodiments, the system may include a particle size analyzer downstream of outlet 82, enabling real-time adjustment of the flow configuration through the U-shaped separator to effect the desired separations.

Utilization of U-shaped inertial separators connected in series or a combination of U-shape inertial separators and cyclones may provide flexibility to allow simultaneously achievement of both target overall separation efficiency and target selectivity of larger particles over smaller particles.

The relatively high concentration of metal trapping additive relative to catalyst, as well as the fluidization and recycle of metal trapping additives, increases the probability of catalyst colliding with the trapping additives in the vessel 22, rendering the trapping of metal contaminants on additive surfaces. This process also serves as a method to decouple catalyst regeneration from additive addition/withdrawal, resulting in large economic benefit to the FCCU operator. In summary, the FCC process of embodiments herein creates a metal trapping additive rich environment in contaminant removal vessel 22, which may substantially increase the trapping efficiency of the metal trapping additives and minimize additive addition to the processing unit, facilitating processing of tight oil and shale oils that include metal contaminants such as iron, calcium, phosphorous, and others, not commonly associated with conventional crude oils.

Embodiments herein describe the catalyst or particle mixture being separated by the solids separator and the effective preferential concentration of a catalyst within the mixture in a reactor. As illustrated in FIGS. 1 and 2, the particles being concentrated in the vessel 22 is illustrated as being returned from the solids separator 32 proximate the top of vessel 22. Embodiments herein also contemplate return of the particles from the solids separator via flow line 34 to a middle or lower portion of the vessel 22, and where the particles are returned may depend on the catalyst metal trapping additive types in the mixture, and the desired catalyst/additive gradient within the reactor vessel, among other possible factors. Embodiments herein also contemplate return of the catalyst to multiple locations within the vessel.

Figure 4:
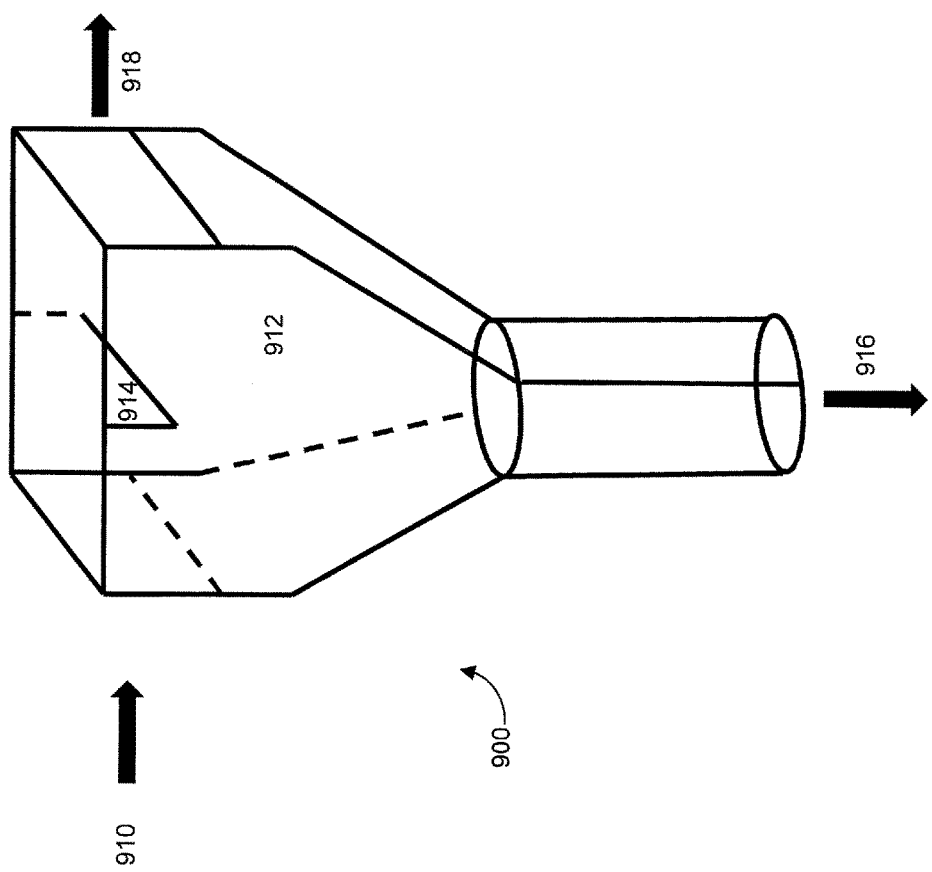

In addition to the U-type particle separator described in relation to FIG. 3, FIGS. 4-6 illustrate various additional separators for use in embodiments herein. Referring to FIG. 4, a baffle chamber separator 900 for separating catalysts or other particles based on size and/or density may include an inlet 910, such as a horizontal conduit. The vapors and particles contained in the horizontal conduit then enter a chamber 912, before being deflected by a baffle 914. The chamber 912 is connected to a first vertical outlet 916 and a first horizontal outlet 918. The baffle 914 may be located in the middle of chamber 912, proximate the inlet 910, or proximate the horizontal outlet 918 of the chamber. The baffle may be at an angle or moveable such that the baffle may be used to deflect more or less catalyst particles, and may be configured for a particular mixture of particles.

Processes herein may utilize the baffle chamber separator 900 to segregate larger and/or denser particles from smaller and/or less dense particles contained in a carrier gas, such as a hydrocarbon reaction effluent. The baffle chamber separator 900 may be configured to: separate at least a portion of a second particle type from the carrier gas and a first particle type, recover the second particle type via the first vertical outlet 916 and recover a mixture including the carrier gas and the first particle type via the first horizontal outlet 918. The separator may also include a distributor (not illustrated) disposed within or proximate the first vertical outlet for introducing a fluidizing gas, facilitating additional separation of the first particle type from the second particle type.

Figure 5:
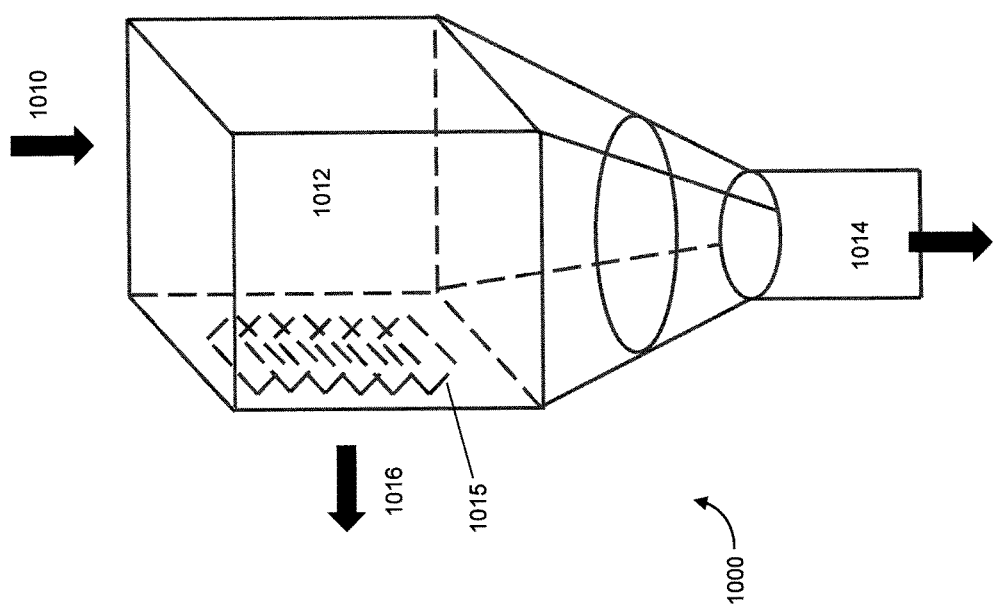

Referring now to FIG. 5, a louver separator for use in accordance with embodiments herein is illustrated. Similar to other separators illustrated and described, the louver separator 1000 may be used for separating catalysts or other particles based on size and/or density. The louver separator 1000 may include a vertical inlet 1010 connected to a chamber 1012 where one or more vertical sides 1015 of the chamber are equipped with narrow slot outlets 1016, which may be described as louvers. The number of louvers may vary depending on the application, such as the desired particle mixture to be separated, and the angle of the louver may be adjustable in order to control the amount of vapor passing through and leaving the louver outlets. The chamber 1012 is also connected to a first vertical outlet 1014 at the bottom of the chamber.

Processes herein may utilize the louver separator 1000 to segregate larger and/or denser particles from smaller and/or less dense particles contained in a carrier gas, such as a hydrocarbon reaction effluent. The louver separator 1000 may be configured to: separate at least a portion of the second particle type from the carrier gas and the first particle type, recover the second particle type via the first vertical outlet 1014 and recover the carrier gas and the first particle type via the louver outlets 1016. The separator may also include a distributor (not illustrated) disposed within or proximate the first vertical outlet for introducing a fluidizing gas, facilitating additional separation of the first particle type from the second particle type.

Figure 6:
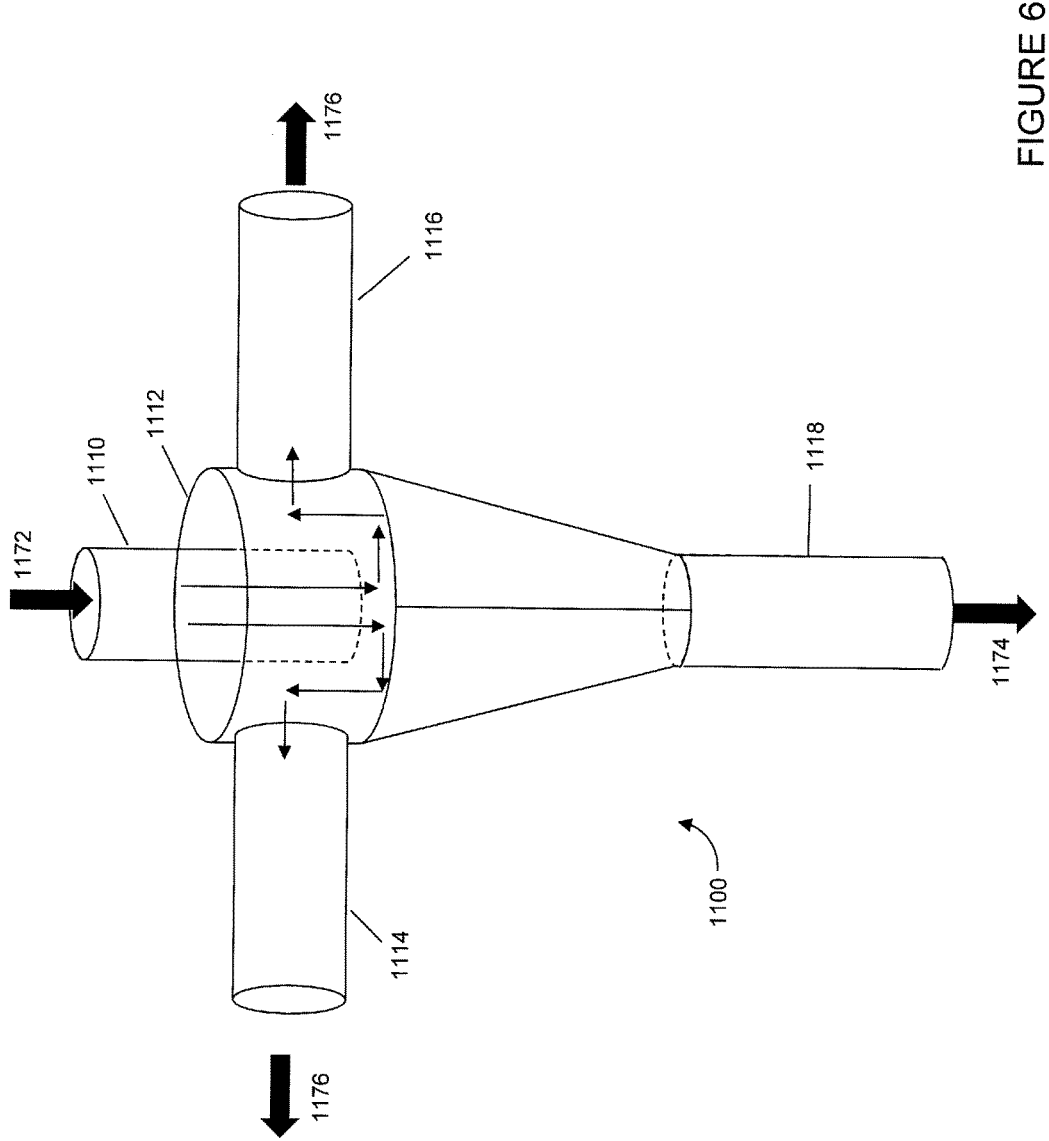

Referring now to FIG. 6, an inertial separator 1100 for use in accordance with embodiments herein is illustrated. Similar to other separators illustrated and described, the inertial separator 1100 may be used for separating catalysts or other particles based on size and/or density. The separator may include an inlet 1110 at the top of and extending into a chamber 1112. In some embodiments, the height or disposition of inlet 1110 within chamber 1112 may be adjustable. The separator may also include one or more side outlets 1114, 1116, such as one to eight side outlets, and a vertical outlet 1118. The separator may also include a distributor (not illustrated) disposed within or proximate the vertical outlet 1118 for introducing a fluidizing gas.

A mixture 1172 of solid particles or catalysts with different sizes is introduced along with a carrier gas stream through inlet 1110. The gases in the mixture 1172 are preferentially directed toward outlets 1114, 1116 based on pressure differentials, and inertial separation forces are applied on the solids by making the particles and carrier gas turn from the extended inlet 1110 within chamber 1112 to flow toward outlets 1114, 1116, the inertial forces separating the different sizes/densities of particles. Larger and/or heavier solid particles 1174 preferentially go downward in sections 1118 to a standpipe or dipleg (not shown) connected to the base of the separator, while lighter and/or smaller solid particles 1176 are preferentially carried along with the gas stream to outlets 1114, 1116, where the mixture of small particles and gases may be recovered.

In each of the separators described herein, by controlling the gas flow rates entering the downward standpipe/separation chamber and exiting the main gas stream outlet, the overall separation efficiency of the separator and the selectivity to separate heavier or larger particles from lighter or smaller particles can be manipulated. This extends to a fully sealed dipleg where the only gas stream exiting the dipleg are those entrained by the exiting solid/catalyst flow.

In some embodiments, a gas sparger or extra steam/inert gas may be provided proximate a top of the heavy/dense particle outlet section, such as near a top of the standpipe inlet. The additional lift gas provided within the separator may further facilitate the separation of heavier or larger solid particles from lighter or smaller solid particles, as the extra gas may preferentially lift lighter solid particles to the gas outlets, resulting in better solid classification.

The particle separators described herein may be disposed external or internal to a vessel. Further, in some embodiments, the large and/or dense particle outlets of the particle separators may be fluidly connected to an external vessel, providing for selective recycle or feed of the separated particles to the desired reactor, so as to maintain a desired catalyst balance, for example.

As described above, embodiments herein provide for the efficient removal of contaminants from catalysts. One or more of the above advantages and features of embodiments of the processes disclosed herein may provide for an improved or optimal process for the catalytic cracking of hydrocarbons for light olefin production. As noted, embodiments disclosed herein may provide for improved contact of contaminated catalyst with a trapping additive, as well as decouple the contaminant removal process from the cracking reactors, improving the overall cracking process, among other advantages.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:
1. A system for cracking hydrocarbons, comprising:
a first reactor for contacting a cracking catalyst with a hydrocarbon feedstock to convert at least a portion of the hydrocarbon feedstock to lighter hydrocarbons;
a separator for separating the lighter hydrocarbons from spent cracking catalyst;
a feed line for feeding separated spent cracking catalyst from the separator to a catalyst regenerator;
a catalyst transfer line for transferring a portion of the spent cracking catalyst from the catalyst regenerator to a contaminant removal vessel;
the contaminant removal vessel, for contacting the spent catalyst with a contaminant trapping additive having an average particle size and/or density greater than those of the cracking catalyst;
a second separator for separating an overhead stream from the contaminant removal vessel into a first stream comprising cracking catalyst and lifting gas and a second stream comprising contaminant trapping additive;
a recycle line for transferring contaminant trapping additive recovered in the second separator to the contaminant removal vessel;
a bottoms product line for recovering contaminant trapping additive from the contaminant removal vessel; and
a line for transferring the first stream to the catalyst regenerator;
wherein the second separator comprises a particle separator for separating contaminant trapping additive from the overhead stream, the second separator comprising:
an inlet for introducing the overhead stream comprising the lifting gas, the contaminant trapping additive, and the cracking catalyst;

a chamber for receiving the overhead stream from the inlet, wherein the chamber is configured to separate at least a portion of the contaminant trapping additive from the lifting gas and the cracking catalyst;

a first outlet to recover the contaminant trapping additive;

a second outlet to recover the lifting gas and the cracking catalyst; and a distributor disposed within or proximate the first outlet for introducing a fluidizing gas, facilitating additional separation of the contaminant trapping additive from the cracking catalyst.

2. The system of claim 1, wherein the second separator is internal to the contaminant removal vessel.

3. The system of claim 1, further comprising a lifting gas feed system configured to feed the lifting gas at a feed rate sufficient to fluidize the contaminant trapping additive and to carry over contaminant trapping additive and catalyst to the second separator.

4. The system of claim 1, wherein a cross-sectional area of the chamber or a portion thereof is adjustable.

5. The system of claim 1, further comprising a movable baffle disposed within one or more sections of the chamber.

* * * * *